(12) United States Patent
Gordon

(10) Patent No.: US 12,263,879 B2
(45) Date of Patent: Apr. 1, 2025

(54) STROLLER BALANCE AND STORAGE APPARATUS

(71) Applicant: Opening Opus Corporation, Toronto (CA)

(72) Inventor: Alda Tarcisia Gordon, Toronto (CA)

(73) Assignee: OPENING OPUS CORPORATION, Toronto (CA)

( * ) Notice: Subject to any disclaimer, the term of this patent is extended or adjusted under 35 U.S.C. 154(b) by 69 days.

(21) Appl. No.: 17/518,620

(22) Filed: Nov. 4, 2021

(65) Prior Publication Data

US 2022/0135108 A1 May 5, 2022

Related U.S. Application Data

(60) Provisional application No. 63/109,560, filed on Nov. 4, 2020.

(51) Int. Cl.
*B62B 9/26* (2006.01)
*A45C 9/00* (2006.01)
*B62B 7/00* (2006.01)

(52) U.S. Cl.
CPC ............... *B62B 9/26* (2013.01); *A45C 9/00* (2013.01); *B62B 7/00* (2013.01)

(58) Field of Classification Search
CPC ......... B62B 9/26; B62B 9/00; B62B 2301/12; A47C 7/624
See application file for complete search history.

(56) References Cited

U.S. PATENT DOCUMENTS

| 605,038 A | * | 5/1898 | Wirt | B62J 9/22 |
| | | | | 224/463 |
| 806,476 A | * | 12/1905 | Leibenglick | B60R 11/00 |
| | | | | 224/547 |
| 4,930,697 A | * | 6/1990 | Takahashi | B62B 7/086 |
| | | | | D34/27 |

(Continued)

FOREIGN PATENT DOCUMENTS

| CA | 2787740 A1 | 8/2011 |
| CA | 2736129 C | 11/2016 |
| CA | 2745914 | 1/2017 |

OTHER PUBLICATIONS https://www.amazon.com/gp/product/B07GQTSBC8/; "Rollator Walker Attachment Side Bag with Cup Holder by P&F, Deluxe Rolling Walker Pouch, Adult Folding Walker Accessories for Seniors or Elderly (Gray)"; Aug. 22, 2018; see especially images and video.*

*Primary Examiner* — Emma K Frick
(74) *Attorney, Agent, or Firm* — Smart & Biggar LP

(57) ABSTRACT

A bag configured for attachment to a stroller, a stroller in combination with a first and a second bag, and a method of stabilizing a stroller are provided. A stroller including a front support bar, a rear support bar, and a rear axle is used for transportation. A bag configured for attachment to the stroller has a front engagement member, a rear engagement member, a body coupled between and supported by the front and rear engagement members, the body includes at least one pocket arranged inside the body, and a receptacle in the at least one pocket. A weight is received by the receptacle, and when the bag is attached to the stroller, the weight applies a rotational moment at the front support bar of the stroller to resist rotation of the stroller about the rear axle.

15 Claims, 11 Drawing Sheets

(56) References Cited

U.S. PATENT DOCUMENTS

| | | | | |
|---|---|---|---|---|
| 5,071,046 A * | 12/1991 | Miller | ............... | B62J 9/22 224/585 |
| 5,154,331 A * | 10/1992 | Sanders | ............... | A61G 5/10 224/407 |
| 5,702,038 A * | 12/1997 | Miller | ............... | B62B 9/26 150/108 |
| D396,673 S * | 8/1998 | Micoley | ............... | D12/129 |
| 6,036,262 A * | 3/2000 | Shahid | ............... | A47C 7/66 297/188.14 |
| 6,139,046 A * | 10/2000 | Aalund | ............... | B62B 9/20 280/47.38 |
| 6,360,836 B1 * | 3/2002 | Milano, Jr. | ............... | B62B 9/00 280/47.38 |
| 6,394,633 B1 * | 5/2002 | Perez | ............... | B62B 9/00 362/543 |
| 6,766,930 B2 * | 7/2004 | Dixon | ............... | B62B 9/26 224/572 |
| 6,767,028 B2 | 7/2004 | Britton et al. | | |
| 7,540,527 B2 * | 6/2009 | Willis | ............... | A61G 5/0866 280/47.4 |
| 7,789,413 B2 * | 9/2010 | Hei | ............... | B62B 9/26 280/47.38 |
| 7,819,413 B2 * | 10/2010 | White | ............... | B62K 19/40 280/281.1 |
| 8,413,863 B2 * | 4/2013 | Bergman | ............... | B62B 9/26 224/614 |
| 8,857,847 B2 | 10/2014 | Joubert | | |
| 8,967,668 B2 * | 3/2015 | Bollmann | ............... | B60R 9/00 224/409 |
| 9,227,648 B2 * | 1/2016 | Sundberg | ............... | B62B 7/12 |
| 9,517,791 B1 * | 12/2016 | Hawk | ............... | B62B 9/26 |
| 11,008,035 B1 * | 5/2021 | Walker | ............... | B62B 9/08 |
| 11,206,927 B2 * | 12/2021 | Garrison | ............... | A47C 7/624 |
| 11,338,837 B2 * | 5/2022 | Falomir Estarelles | .. | A61G 1/04 |
| 11,447,168 B1 * | 9/2022 | Ferrer | ............... | B62B 7/008 |
| 2002/0093157 A1 * | 7/2002 | Turner | ............... | B62B 7/08 280/47.25 |
| 2002/0093158 A1 * | 7/2002 | Turner | ............... | B62B 9/26 280/47.38 |
| 2002/0093159 A1 * | 7/2002 | Turner | ............... | B62B 7/08 280/47.38 |
| 2002/0093160 A1 * | 7/2002 | Mendenhall | ............... | B62B 9/20 280/47.38 |
| 2002/0093178 A1 * | 7/2002 | Turner | ............... | B62B 9/26 280/658 |
| 2002/0109321 A1 * | 8/2002 | Turner | ............... | B62B 7/08 280/47.38 |
| 2003/0218306 A1 * | 11/2003 | Dixon | ............... | A45C 11/20 280/47.38 |
| 2006/0283904 A1 * | 12/2006 | Dinslage | ............... | B62B 9/26 224/409 |
| 2008/0258437 A1 * | 10/2008 | Ryan | ............... | B62B 9/26 280/47.38 |
| 2013/0162396 A1 * | 6/2013 | Yang | ............... | A61G 5/0833 701/22 |
| 2013/0214565 A1 * | 8/2013 | Nickell | ............... | A47C 7/62 297/30 |
| 2013/0256357 A1 * | 10/2013 | Prosperie | ............... | A61H 3/04 224/572 |
| 2015/0296939 A1 * | 10/2015 | Green | ............... | A45C 3/00 383/38 |
| 2021/0007321 A1 * | 1/2021 | Ceretto | ............... | A01K 1/0254 |
| 2022/0126903 A1 * | 4/2022 | Xiao | ............... | B62B 7/06 |

* cited by examiner

STROLLER BALANCE AND STORAGE APPARATUS

CROSS REFERENCE TO RELATED APPLICATION

This application claims priority to U.S. Provisional Application No. 63/109,560 filed Nov. 4, 2020, the entire contents of which are hereby incorporated herein by reference.

FIELD

The present disclosure relates generally to an apparatus for balancing a stroller and providing additional storage.

INTRODUCTION

The following paragraphs are not an admission that anything discussed in them is prior art or part of the knowledge of persons skilled in the art.

Modern strollers are available in a number of different designs and configurations. Generally, they have multiple wheels, a seat, and a handle that allows an operator to pilot the stroller. Strollers may additionally come equipped with storage pockets and compartments that may be used to store a plurality of objects. These objects may include children's toys, food and beverages, clothing, accessories, hygienic products, and more.

After-market handle storage devices are often added by stroller operators. These storage devices may include bags, containers, or cup holders. These devices may vary in size and shape, and allow the operator to store items, such as drinks (including, but not limited to, coffee), items for the infant (such as wipes, toys, pacifiers, etc.), the operator's wallet, keys, and mobile device, amongst other things. Also, stroller operators may hang clothes article such as jackets on the handles of the stroller.

These items attached to the stroller handle may apply a significant downward force on the handle, tending to urge the stroller to rotate backwards about the axis of the rear wheels. This may be compounded by other forces in a particular frame of reference, for example, when the stroller is facing forwards on a vehicle that suddenly accelerates, or when a rearward facing stroller is on a vehicle that suddenly brakes.

This undesired rotation may cause damage to the stroller, injury to the operator, injury to the infant inside the stroller, or a combination thereof.

Based on the specific physical design, weight, and geometry of a stroller, the stroller will be governed by different mechanics and dynamics. For example, when the weight is of the overall stroller is increased, a greater force is required to accelerate the stroller. Similarly, when an operator pushes straight downwards on the stroller handle with a great amount of force, this may cause the stroller to rotate around the axis of the rear wheels, lifting the front wheels off the ground. The amount of force that will need to be applied in this manner to ensure that the front wheels lift off the ground will vary depending on the relative forward/backwards weight distribution of the unloaded stroller, the distances between the stroller axles, the position of the handle relative to the axles, the weight and position of cargo held in the storage areas of the stroller, the weight of the child seated in the stroller, and the position of their seat relative to the axles and handle of the stroller.

While some of these factors may be varied, such as the weight of cargo placed in the stroller, these factors are largely fixed. For example, the position of cargo in the stroller may be fixed by the location of cargo storage areas relative to the other components of the stroller. If these factors are fixed, it may be difficult to vary the mechanics and dynamics of the stroller.

Different operators may prefer different mechanics. For example, if one is relatively short and small, they may prefer a stroller that may be easily maneuvered and lifted. In contrast, if one is large and relatively strong, they may prefer a stroller that is more resistant to certain motions, such as tipping and rolling about the rear axis. This more resistant stroller may provide greater operator control, at the cost of increased force required from the end user. However, some users may prefer this force to control trade-off.

While there are a wide variety of strollers available on the market, it may be difficult for a consumer to find one that may meet their convenience, size, and price demands, while also demonstrating mechanical and dynamic properties suitable for a specific operator. There is a need for a solution that allows one to vary the mechanics and dynamics of an existing stroller of fixed size, weight and geometry in order to address the stability problems described above.

BRIEF DESCRIPTION OF THE DRAWINGS

The drawings included herewith are for illustrating various examples of apparatuses and methods of the present disclosure and are not intended to limit the scope of what is taught in any way.

DETAILED DESCRIPTION

Figure 1:
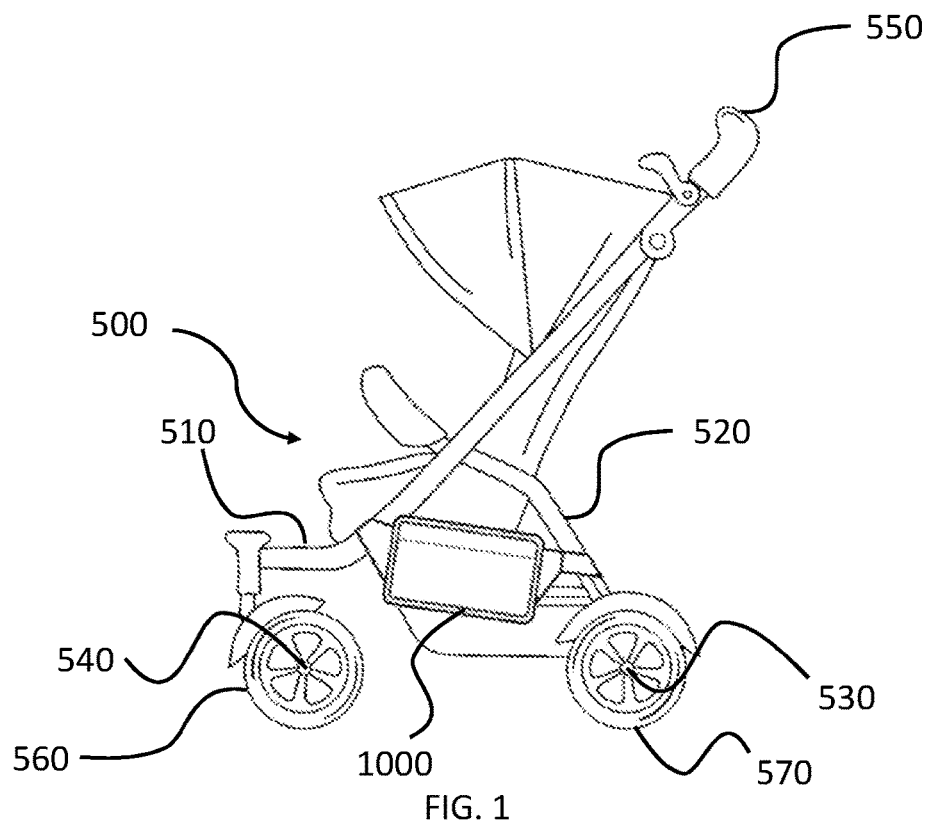
FIG. 1 shows a side view of a stroller with an example of a stroller stabilizing bag attached.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

It will be appreciated that, for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

In accordance with the teachings herein, there are provided various examples for a stroller stabilizing apparatus, and related methods.

Referring to FIG. 1, pictured therein is an example of a bag 1000 for stabilizing an example stroller 500. The stroller 500 includes a front support bar 510, a rear support bar 520 and a rear axle 530. The front support bar 510 may generally be the structural component that attaches the front axle of the stroller to the frame of the stroller. Similarly, the rear support bar may generally be the structure that attaches the rear axle to the frame of the stroller.

Figure 2:
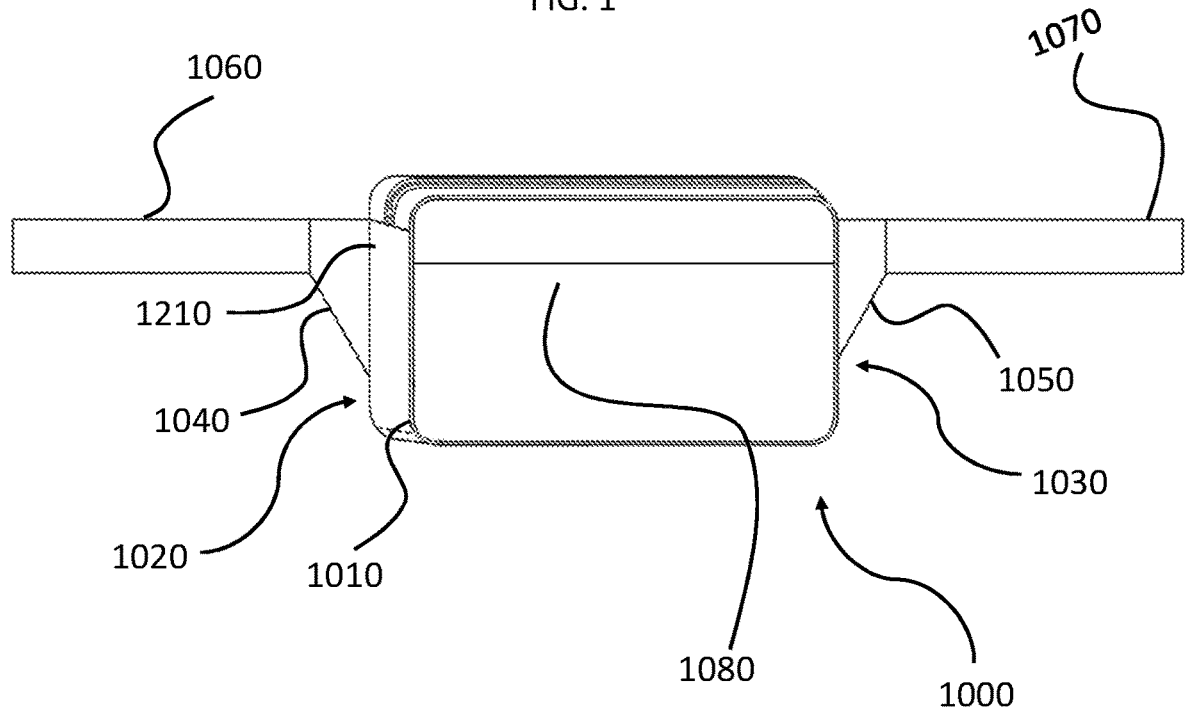
FIG. 2 shows a detailed front view of the bag of FIG. 1.
Figure 3:
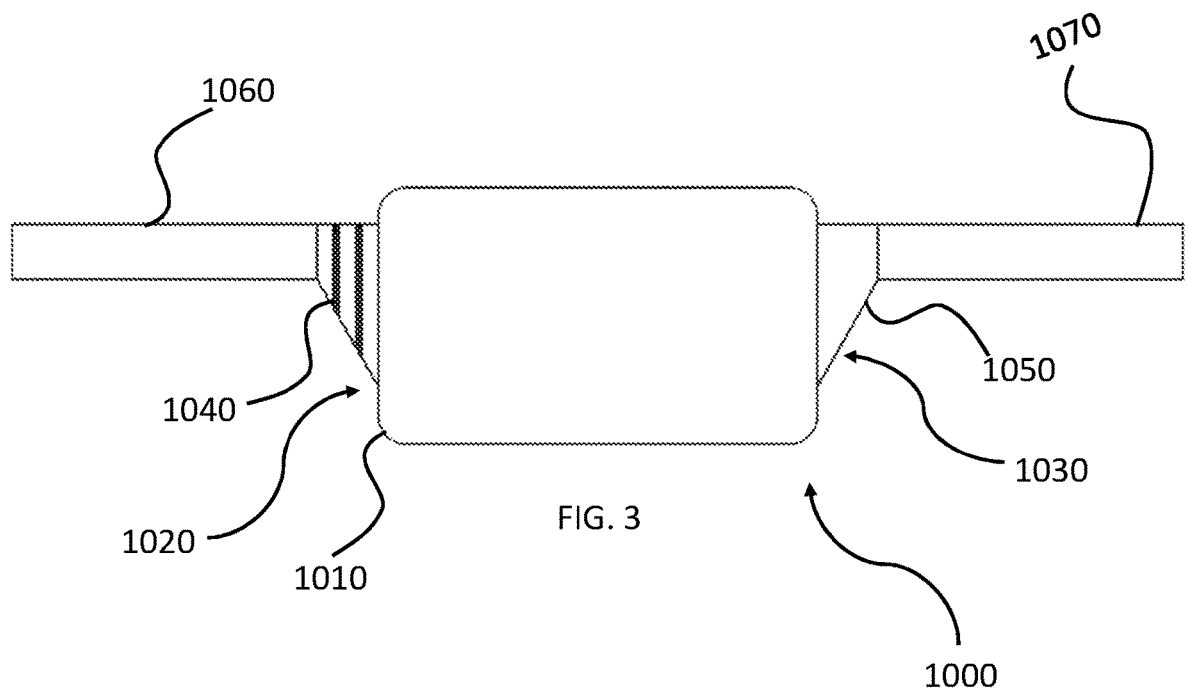
FIG. 3 shows a detailed rear view of the bag of FIG. 1.

Referring to FIGS. 2 and 3, pictured therein is a detailed view of the example of the bag 1000 of FIG. 1. FIG. 2 shows the front of bag 1000 and FIG. 3 shows the rear of the bag 1000.

In the example illustrated, the bag 1000 includes a body 1010 and a pocket 1080 disposed within the body. The body 1010 defines a volume of the pocket 1080 in which objects may be placed into. In some examples, the body is constructed from woven nylon fabric. In some examples, the bag 1000 may be constructed from any number of woven or non-woven fabrics or other materials. These may include cotton, denim, polyester, felt, natural leather, faux leather, or any other material that may be known in the art to be suitable for the construction of bags, purses or satchels.

In some examples, the body 1010 may be further coated in an anti-fungal and/or antimicrobial material. Strollers are often subject to harsh conditions, and may be in contact with bacteria, fungi and bodily fluids that may contain bacteria and/or fungi. It may be advantageous to coat the body 1010 in an anti-fungal and/or antimicrobial material to reduce the transmission of dangerous bacteria and fungi.

In some examples, the body 1010 may have a dimension ratio of 1.7, such that the length of the bag is 1.7 times the height of the bag. In some specific examples, the body 1010 may have approximate dimensions of 30.5 cm length and 17.7 cm height. Other configurations are possible.

The body 1010 may include an aperture for access into the pocket 1080. The aperture may provide access to this volume, such that a user may place objects into the pocket 1080. In some examples, the pocket 1080 may additionally include a sealing mechanism. This may include a zipper seal, buttons, snaps, hook and loop fasteners, or any other means known in the art for sealing a pocket of a bag, purse, or similar article.

A user may use the volume defined by the body 1010 and the pocket 1080 as additional storage as needed. Strollers often come equipped with storage pockets, compartments, and areas. However, strollers will generally have fixed amounts of storage. The bag 1000 provides the benefit of additional storage when attached to the stroller 500 in a stabilizing position.

In the example illustrated, the bag 1000 has a first side 1020 and second side 1030. The first side 1020 is defined as the side proximate the front support bar 510 of the stroller 500 when the bag 1000 is mounted in position. The second side 1030 is defined as the side proximate the rear support bar 520 of the stroller 500 when it is mounted onto the stroller 500.

In the example illustrated, the body 1010 further includes a first side panel 1210, which is proximate the first side 1020.

In the example illustrated, the bag 1000 further includes a front engagement member 1060 and a rear engagement member 1070. The front engagement member 1060 is proximate the first side 1020 and the rear engagement member 1070 is proximate the second side 1030. The engagement members 1060, 1070 are shown to be substantially ribbon shaped, such that their lengths are significantly larger than the width of each member. In some examples, the length of each member 1060, 1070 may be approximately 15 cm.

In some examples, the front engagement member 1060, or rear engagement member 1070, or both, may be constructed such that their total length is adjustable. In some examples, the length of each member 1060, 1070 may range from approximately 10.37 cm to 20.75 cm. This allows for the bag 1000 to be configured for attachment onto strollers with different overall dimensions.

In some examples, the engagement members 1060, 1070 may be constructed from the same material as the bag 1010. In other examples, the engagement members 1060, 1070 may be constructed from a material different from the body. This may provide a cost advantage, as the engagement members 1060, 1070 may require a higher strength material to ensure product reliability, as they may be subject to larger forces. Otherwise, the material chosen may differ from the material of bag 1010 for aesthetic purposes. The material of the engagement members 1060, 1070 may be selected from the following list: cotton, denim, polyester, felt, natural leather, faux leather, or any other material that may be known in the art to be suitable for the construction of bags, purses or satchels, and/or their strap components.

In the example illustrated, the bag 1000 further includes a first wing 1040 and second wing 1050. The first wing 1040 is shown situated between the body 1010 and the front engagement member 1060, and mechanically connects the front engagement member 1060 to the body 1010. The second wing 1050 is shown situated between the body 1010 and the rear engagement member 1070, and mechanically connects the rear engagement member 1070 to the body 1010. The first wing 1040 and second wing 1050 may be substantially triangular in shape. In other examples, the wings 1040, 1050 may taper, such that their heights decrease along the length of each component, and such that their heights are largest on the side that each of the wings 1040, 1050 attach to the bag 1010, and smallest on the side that the wings 1040, 1050 attach to the engagement members 1060, 1070, respectively.

In some examples, without a first wing 1040 and/or second wing 1050, the front engagement member 1060 may attach directly to body 1010, and the rear engagement member 1070 may attach directly to body 1010. The presence of the first wing 1040 and second wing 1050 may provide a larger surface area for frictionally engaging an external surface. The larger surface area may provide for a larger frictional force to maintain the bag 1000 in the stabilizing position.

Figure 4:
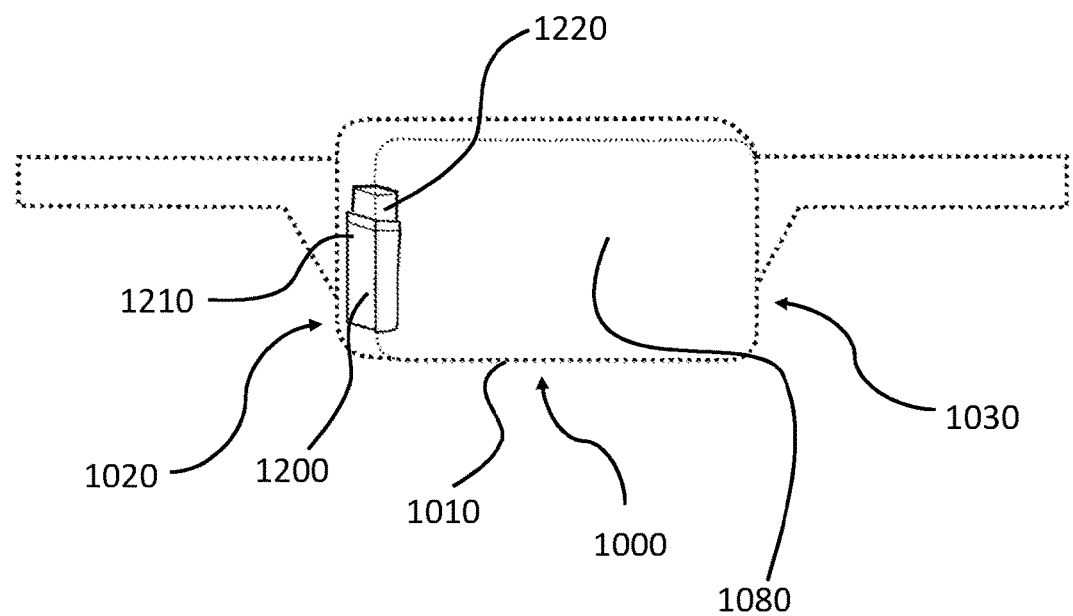
FIG. 4 shows an internal view of the bag of FIG. 1, depicting the bag outlined in broken lines, and detailing internal components in solid lines.

Referring to FIG. 4, a receptacle 1200 is shown in the pocket 1080, internal to the body 1010, and positioned proximate to the first side 1020 of bag 1000. The receptacle 1200 may take various forms. In some examples, the receptacle 1200 may be constructed from an elastic fabric material. In other examples, the receptacle 1200 may be constructed from non-elastic materials.

In the example illustrated, the receptacle 1200 is attached to an internal wall of the body 1010 by stitches. In other examples, the receptacle 1200 may be attached to the body 1010 by other means, including but not limited to, adhesives, ultrasonic welding, heat welding or any other means known in the art that may bond fabric to fabric, or any other material to fabric.

In the example illustrated, a weight 1220 is inserted into the receptacle 1200. In some examples, the weight 1220 may take the form of an iron bar, having a mass of approximately 454 g. In other examples, the weight may be at least 113 g, 226 g, 340 g, 680 g, or 903 g. In some examples, the weight 1220 may be formed with smooth surfaces and rounded edges, e.g. shaped like a piano key. In some examples, the weight 1220 may coated with rubber or another material, and/or may have a piano black lacquer finish.

In some examples, the weight 1220 may have approximate dimensions of 11.5 cm×2.5 cm×2.0 cm. In other examples, the weight may have other external dimensions.

In some examples, the weight may consist of multiple pieces, and each piece may have a known mass. This allows an operator to adjust the amount of total mass placed in the receptacle. This in turn adjusts the forces applied to the stroller on which the bag is attached. In other examples, the bag may include multiple receptacles, with each receptacle designed to receive a separate weight.

In some examples, the receptacle 1200 may be constructed from an elastic material, with an internal volume slightly smaller than the volume of the portion of the weight 1220 that will be inserted into the receptacle 1200. As the weight 1220 is inserted into receptacle 1200, the elastic material thereby secures the weight 1220 in the receptacle 1200.

In the example illustrated, the receptacle 1200 is attached to the first side panel 1210. In other examples, the receptacle 1200 may be fixed inside the pocket 1080 at various other positions.

Figure 5:
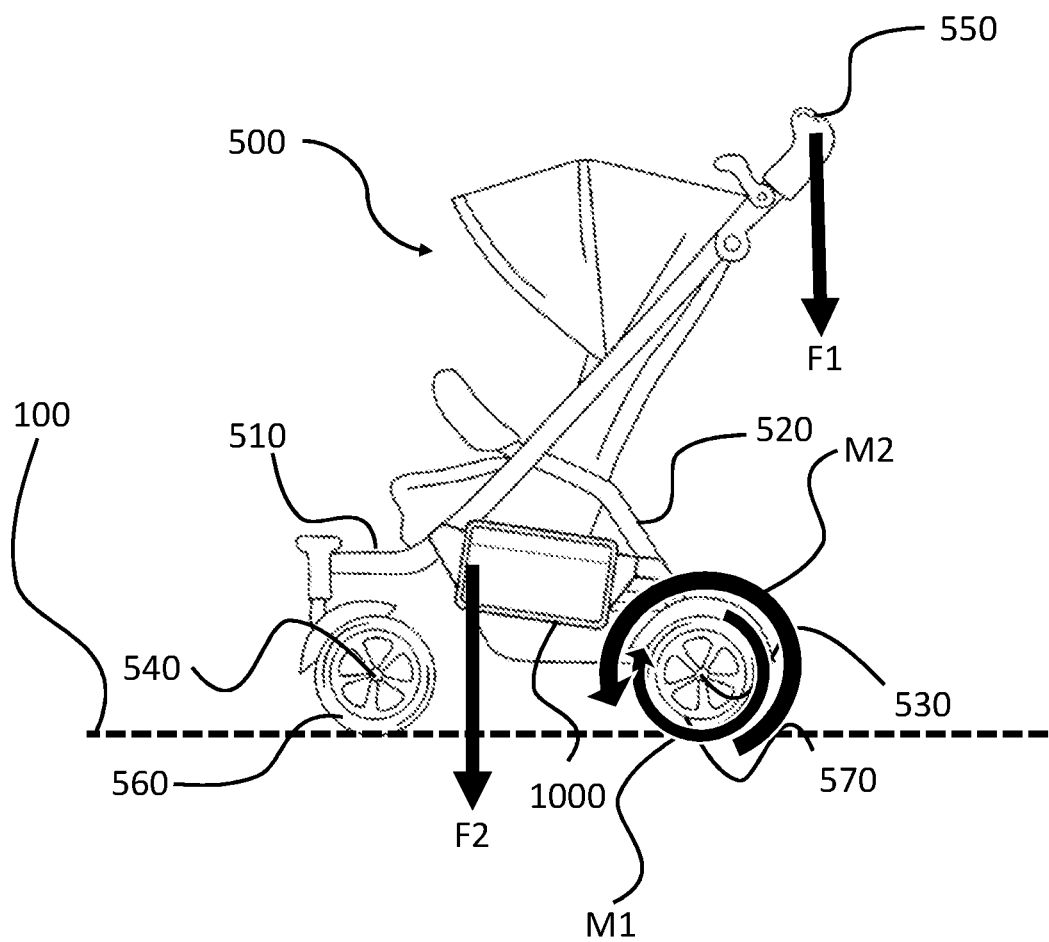
FIG. 5 shows another side view of the stroller and the bag of FIG. 1, further depicting forces and moments acting upon the stroller.

Referring to FIG. 5, the bag 1000 is shown coupled to the stroller such that the body 1010 of the bag 1000 is suspended between the front axle 540 and rear axle 530 of the stroller 500. The front engagement member 1060 is coupled to the front support bar 510, and the rear engagement is coupled to the rear support bar 520. Although not shown, the weight 1220 is present inside the receptacle 1200.

In the example illustrated, the stroller 500 is on a horizontal surface 100, as it may be when being pushed by the operator. If the operator applies a force F1 downwards onto handle 550, a rotational moment M1 is applied about rear axle 530. The direction of this moment M1 is clockwise. Clockwise moments will herein be referred to as negative moments, and counterclockwise moments will herein be referred to as positive moments. The weight of the stroller forward of the rear axle 530 will apply a resultant downwards force onto the stroller due to gravity. This downwards gravitational force will result in a positive, counterclockwise moment about rear axle 530. This positive moment will counteract the negative moment resulting from applied force F1.

In the event that the moment M1 resulting from the application of force F1 is greater in magnitude than the moment applied about the rear axle 530 by the weight of the stroller forward of the rear axle 530, a net moment imbalance will occur. The negative, clockwise moment will be greater in magnitude than the positive, counterclockwise moment. This will result in a rotation of the stroller 500, counterclockwise about the rear axle 530. This rotation will raise the front wheels 560 of the stroller off the horizontal surface 100. The condition in which the front wheels 560 are raised off the horizontal surface 100 may be dangerous, reducing the stability of the stroller 500, and increasing the risk of rollover.

When the bag 1000 is attached to the stroller 500, with the weight 1220 installed in the receptacle 1200, the mass of the stroller in front of the rear axle 530 is increased. This increases the gravitational force of the stroller mass in front of the rear axle 530. In turn, the positive moment M2 resulting from this about the rear axle 530 is increased. As a result, the force F1 required to generate a negative moment about the rear axle 530 is increased. In other words, the magnitude of the force F1 that the operator needs to apply to the stroller 500 to raise the front wheels 560 off the horizontal surface 100 is increased. This increases the stability of stroller 500.

The position of the weight 1220 relative to the rear axle 530 will impact the component of the positive moment M2 about the rear axle 530 that is contributed by the force F2 applied to the stroller by the weight 1220. That is, the further the weight 1220 is away from the rear axle 530, the greater the magnitude of the positive moment M2 resulting from the force F2. It may be advantageous to place the weight 1220 as far forward of the rear axle 530 as reasonably possible. This maximizes the resulting moment M2 for a given mass of the weight 1220.

It may also be desirable to minimize the mass of the weight 1220, because the weight 1220 increases the total mass of the entire loaded stroller 500. A loaded stroller 500 of lower mass will be easier for the operator to move, control and stop, and may reduce wear and tear on any braking mechanism the stroller 500 is equipped with.

Accordingly, the position and quantum of mass for the weight 1220 needs to be selected appropriately in view of these considerations.

In some situations, it may be desirable for the front wheels 560 to be raised off the ground while the rear wheels 570 remain in contact with the horizontal surface 100. For example, when the operator wishes to navigate the stroller 500 onto a raised surface with no ramp, such as a curbed sidewalk above street level, and the operator may apply a force F1 downwards on the handle 550 to raise the front wheels 560 off of the horizontal surface 100. In such situations, the increased force F1 requirement may be desirable, as the raising of the front wheels 560 may require less fine motor control, and decrease the risk that the front wheels 560 are raised too high and cause the stroller 500 to tip backwards.

In other situations, the increased force F1 requirement for this maneuver may be a disadvantage. A weaker operator may be more physically strained by the increased force requirement. In this situation, it may be desirable to adjust the mass of weight 1220 present in the receptacle 1200. A weight 1220 of lower mass may be inserted instead, or the weight may be removed altogether, then replaced once this maneuver is complete, or a different operator takes control of the stroller 500.

Figure 6:
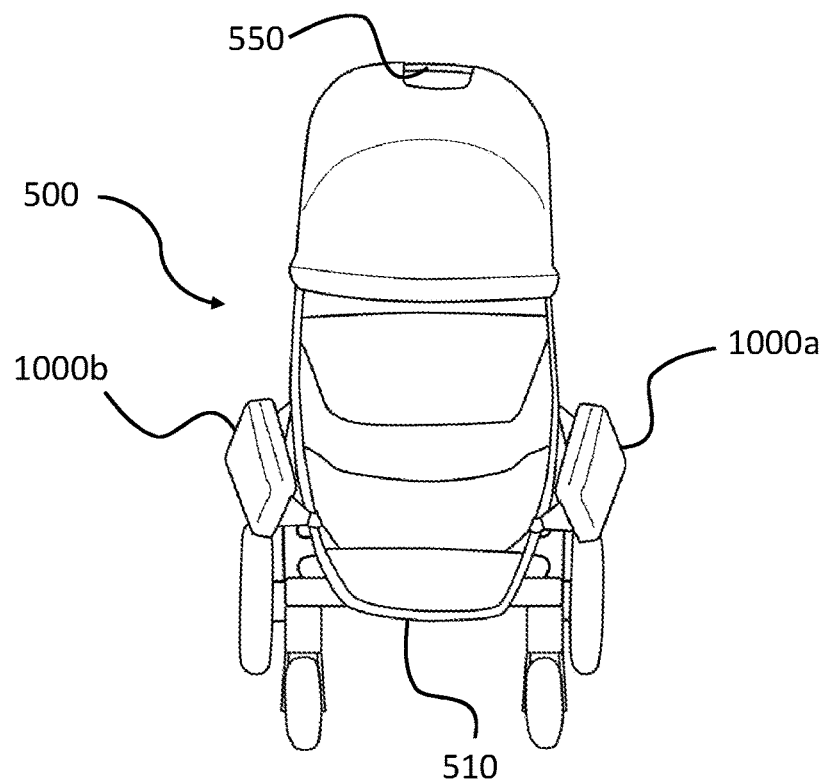
FIG. 6 shows a front view of the stroller with two of the bags of FIG. 1, one attached per side.

Referring to FIG. 6, the operator may attach one bag 1000 to each side of the stroller, i.e. the left bag 1000a and the right bag 1000b. This will result in two additional weights 1220 placed onto the stroller 500, resulting in a greater degree of stabilization that may be uniform across both the left and right side of the stroller 500. Each bag 1000 may be designed for one side of the stroller 500. For example, the location of receptacle 1200 can be adjusted to place the weight 1220 as far away from rear axle 530 as possible. In some examples, there can be two distinct bag constructions for the bags 1000a, 1000b, each configured for a specific side of a stroller 500, and they may be mirror images of one another. Otherwise, the bags 1000a, 1000b may be structurally identical.

Figure 7:
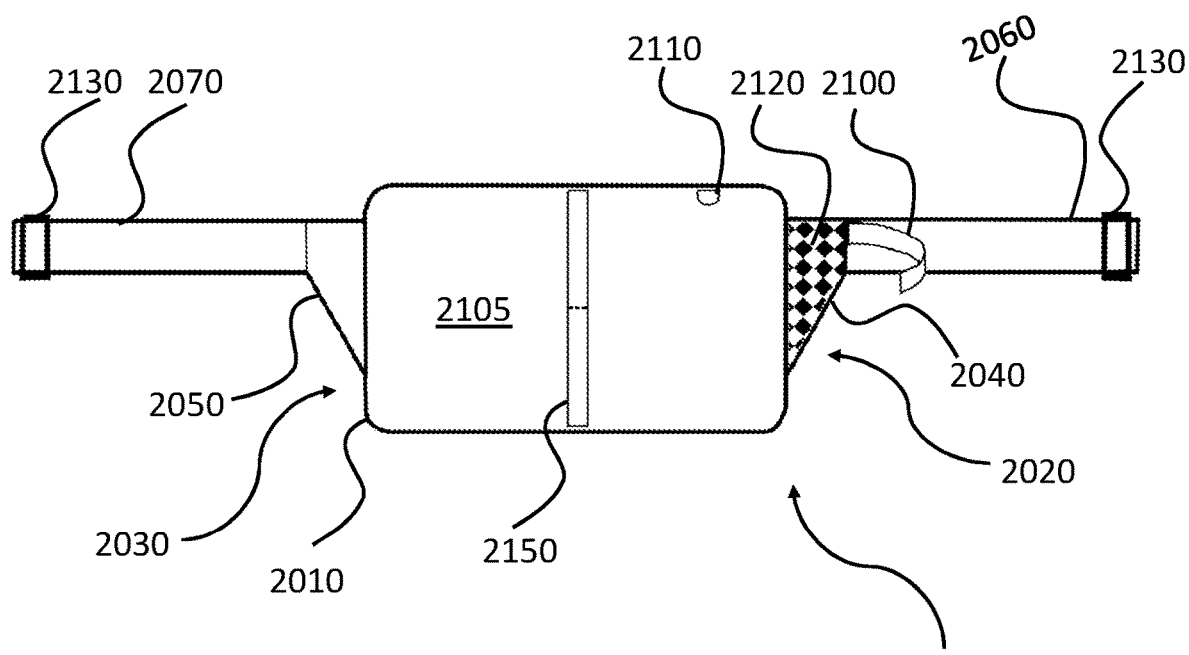
FIG. 7 shows a detailed rear view of another example of a stroller stabilizing bag.

Referring to FIG. 7, pictured therein is another example of a bag 2000 for stabilizing a stroller. The bag 2000 may include all of the features of the bag 1000.

In the example illustrated, the bag 2000 includes fastening mechanisms 2130. Each of the fastening mechanisms 2130 is located at the distal end of the engagement members 2060, 2070. The fastening mechanisms 2130 may be configured to interconnect with each other, to affix the distal ends of engagement members 2060, 2070. In some examples, the fastening mechanisms 2130 can take the form of a quick release buckle. In other examples, the fastening mechanisms 2130 may be any mechanism known in the art that allows one to fasten two items together, and repeatedly attach and detach without tools. This includes, but is not limited to, buckles, snaps, buttons, and hook and loop fasteners.

Figure 8:
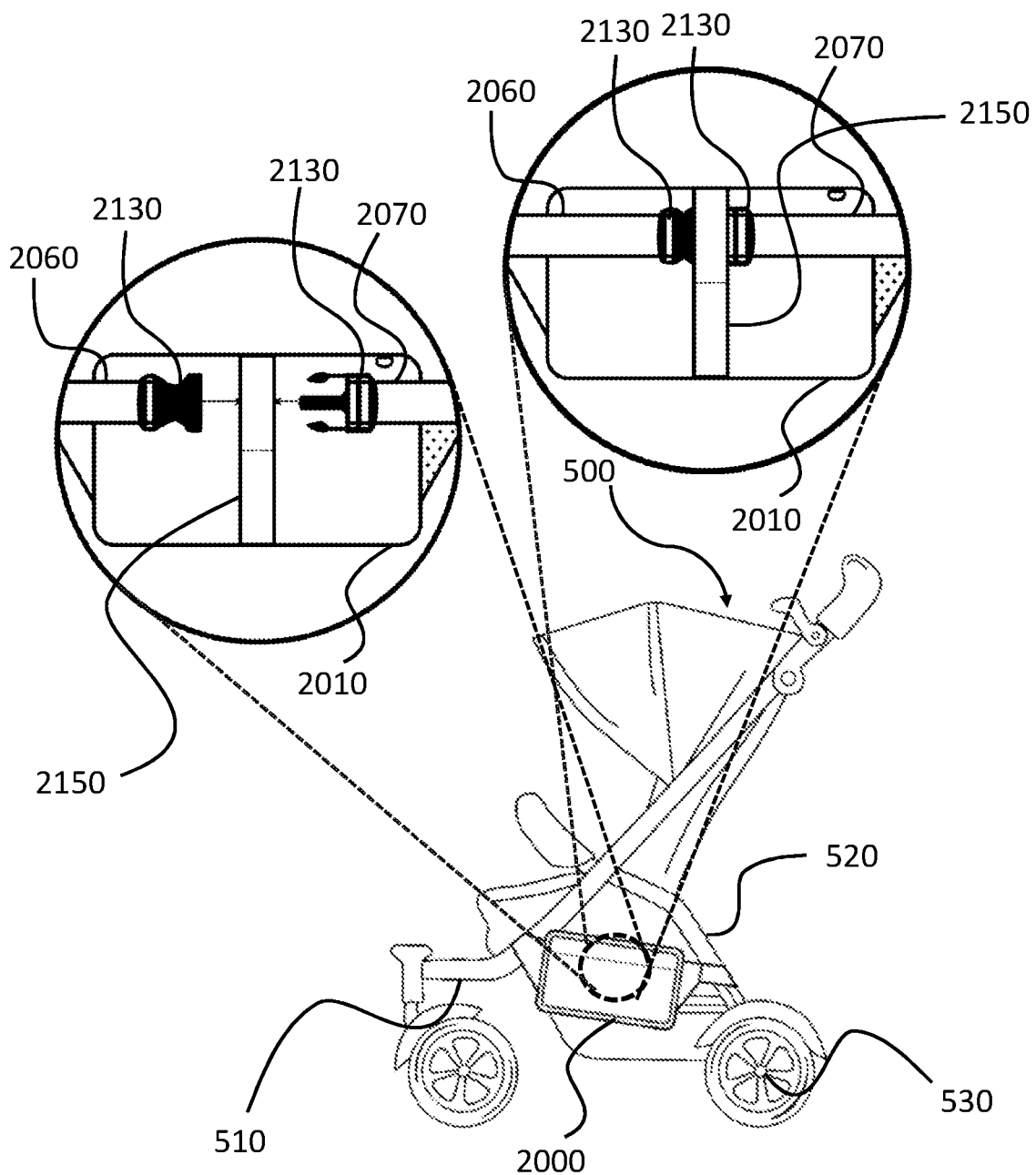
FIG. 8 shows a side view of a stroller with detailed views of the bag of FIG. 7 being attached thereto.
Figure 9:
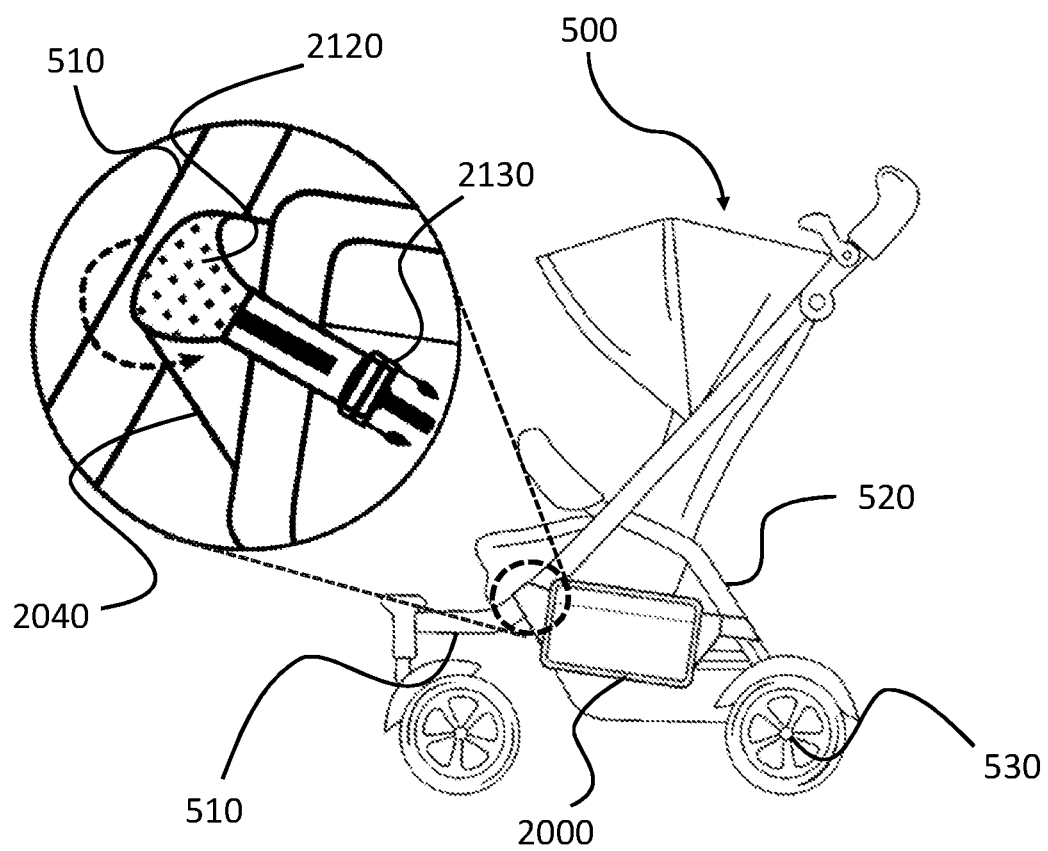
FIG. 9 shows another side view of the stroller with a detailed view of the bag of FIG. 7 being attached thereto.

In some examples, the bag 2000 may be affixed to stroller 500 by positioning bag 2000 between the front support bar 510 and the rear support bar 520, wrapping the front engagement member 2060 around the front support bar 510 and the rear engagement member 2070 around the rear support bar 520, and fastening the fastening mechanisms 2130, thereby securing the front engagement member 2060 to the rear engagement member 2070. This continuous loop formed by the engagement members 2060, 2070, the wings 2040, 2050 and the body 2010, wraps around the triangular structure formed by the support bars 510, 520 of the stroller. Because the continuous loop may be of a fixed circumference, this establishes the position of the bag 2000 secured on the stroller 500, as illustrated in FIGS. 8 and 9. In some examples, the loop may have a circumference of approximately 73 cm. In some examples, in which the members 2060, 2070 are adjustable in length, the circumference may range from 60 cm to 86 cm.

Referring to FIGS. 7 and 8, the bag 2000 is shown to further include a fastener loop or stay 2150 affixed to a rear panel 2105. In the example illustrated, the members 2060, 2070 and/or the fastening mechanisms 2130 are held behind the stay 2150, between the stay 2150 and the body 2010, to keep the members 2060, 2070 adjacent to the body 2010 and therefore the bag 2000 secured closer to the stroller 500. This may prevent the body 2010 of the bag 2000 from swaying away from the stroller 500 over bumpy terrain, or when sharp turns are made.

Referring to FIGS. 7 and 9, the bag 2000 is shown to further include a non-slip material 2120 applied to the first wing 2040. The non-slip material 2120 may be constructed out of rubber materials, or any material known in the art that may have a coefficient of friction greater than the coefficient of friction of the base construction material of the first wing 2040. In the example illustrated, when the bag 2000 is installed onto the stroller 500, the front engagement member 2060 and the first wing 2040 are wrapped around the front support bar 510. The non-slip material 2120 frictionally engages with front support bar 510, further securing the bag 2000 to stroller 500. The larger area of the wing 2040 may allow for a larger area to frictionally engage the front support bar 510, increasing the frictional force supporting the position of the bag 2000 attached to the stroller 500.

Figure 10:
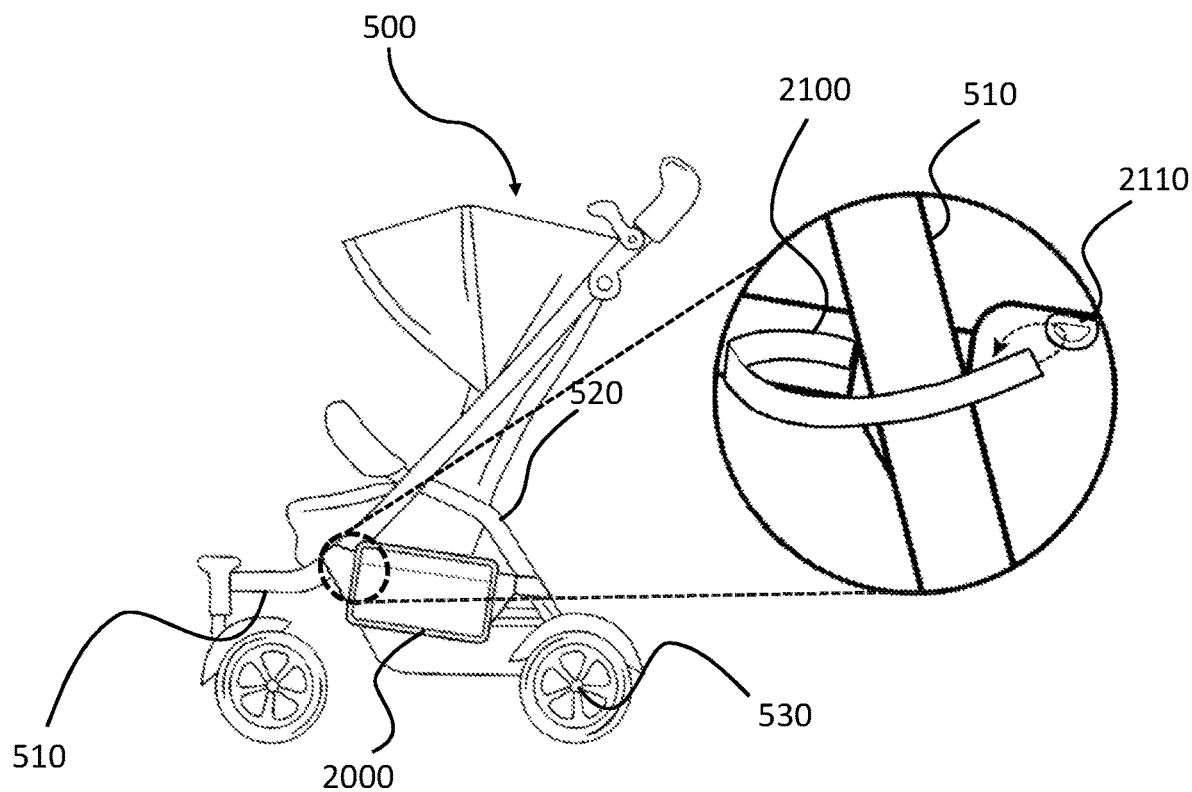
FIG. 10 shows another side view of the stroller with a detailed view of the bag of FIG. 7 being attached thereto.

Referring to FIGS. 7 and 10, the bag 2000 is shown to further include the rear panel 2105, a strap 2100 and a ring 2110. In the example illustrated, the strap 2100 and the ring 2110 are positioned proximate to a first side 2020 of the bag 2000, with the strap 2100 affixed to the wing 2040 and the ring 2110 affixed to the rear panel 2105. The strap 2100 may include a hook and loop fastening mechanism so that the strap 2100 may pass through the ring 2110 and be secured against itself. When attaching the bag 2000 to the stroller 500, the strap 2100 may be wrapped around the front support bar 510, inserted through ring 2110, and secured to itself.

The strap 2100 and the ring 2110 may combine to serve as a second, independent fastening mechanism. If the fastening mechanisms 2130 fails, the strap 2100 and the ring 2110 may remain attached to the front support bar 510, thereby providing an additional means of securing the bag 2000 to the stroller 500. Similarly, if the strap 2100 and the ring 2110 fails, the primary fastening mechanisms 2130 will remain, securing the bag 2000 to the stroller 500. This arrangement is intended to prevent the operator from losing the bag 2000.

In the example illustrated, the ring 2110 is D-shaped. In other examples, it may take on different shapes and forms.

In other examples, the strap 2100 may be fastened to itself using a mechanism other than a hook and loop fastener mechanism. This may include, but is not limited to, buttons, snaps, laces or any other mechanism known in the art that allows for tool free, non-permanent fastening.

Figures 11, 12:
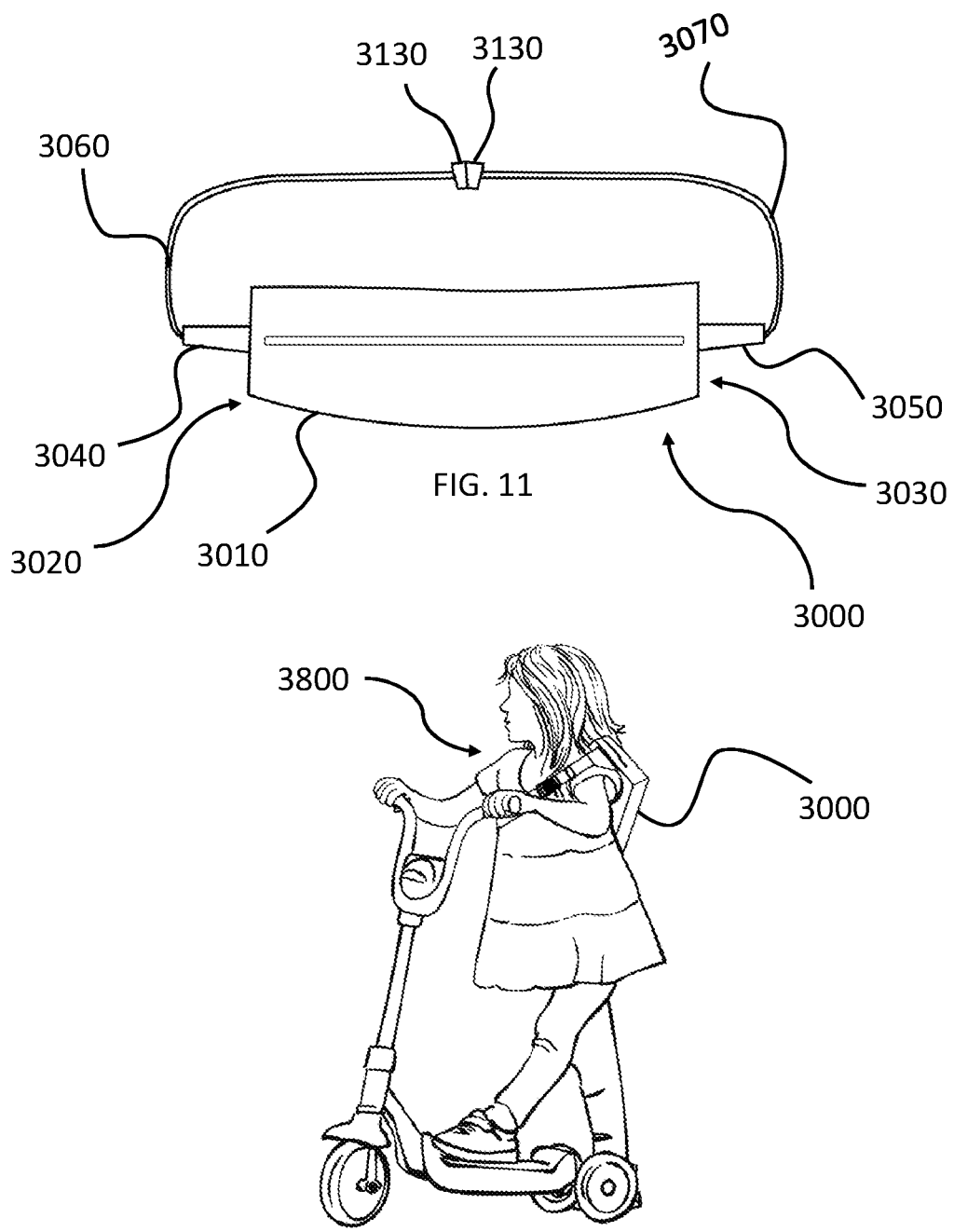
FIG. 11 shows another example of a stroller stabilizing bag, in which the front and rear engagement members are fixed together, forming a continuous loop.
FIG. 12 shows the bag of FIG. 11 being worn by an individual as a crossbody bag.

Referring to FIGS. 11 and 12, pictured therein is another example of a bag 3000 for stabilizing a stroller. The bag 3000 may include all of the features of the bags 1000, 2000.

In the example illustrated, when the bag 3000 is removed from stroller, the bag 3000 may be worn as a crossbody bag. An individual 3800 may fasten the fastening mechanisms 3130, securing the front engagement member 3060 to the rear engagement member 3070. This results in a continuous loop, formed by the engagement members 3060, 3070, the wings 3040, 3050 and the body 3010. The loop, which may be of a fixed circumference, may be placed onto the individual's shoulder on one side and under their arm on the other side, as shown in FIG. 12. Wearing the bag 3000 in this manner may only be reasonable for smaller individuals, such as children, due to the size of the circumference of the continuous loop, which may range from 60 cm to 86 cm in some examples.

Figure 13:
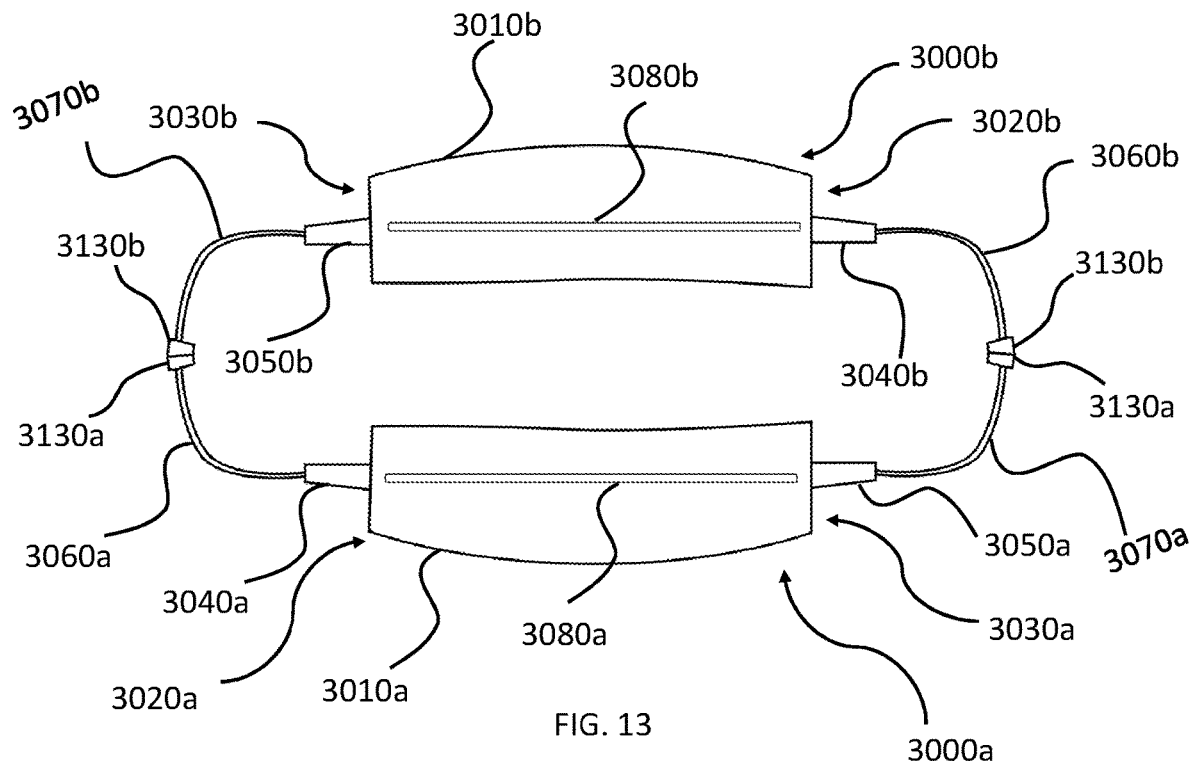
FIG. 13 shows a pair of the bags of FIG. 11, in which the engagement members of the first bag are fixed to the engagement members of the second bag, forming a continuous loop.
Figure 14:
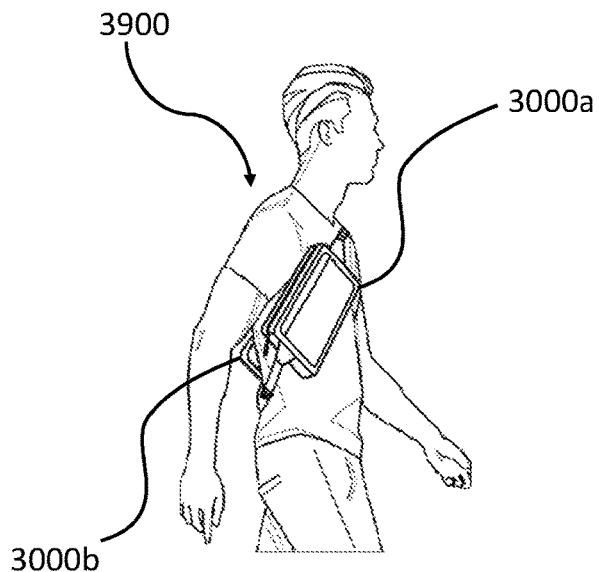
FIG. 14 shows the pair of bags of FIG. 13, being worn by an individual as a crossbody bag.

Referring to FIGS. 13 and 14, the bag 3000 may be configured such that an adult-sized individual 3900 is able to wear it as a crossbody bag. In the example illustrated, two of the bags can be provided for stabilizing opposite sides of the stroller, i.e. the left bag 3000*a* and the right bag 3000*b*. As shown, the fastening mechanisms 3130*a* of the bag 3000*a* may be attached to the fastening mechanisms 3130*b* of the bag 3000*b*, to form a continuous loop. This arrangement may result in a circumference that is approximately twice as large as that for one bag. In some examples, this circumference may range from 120 cm to 172 cm. This increased circumference may be sufficiently large to accommodate the adult-sized individual 3900.

Figure 15:
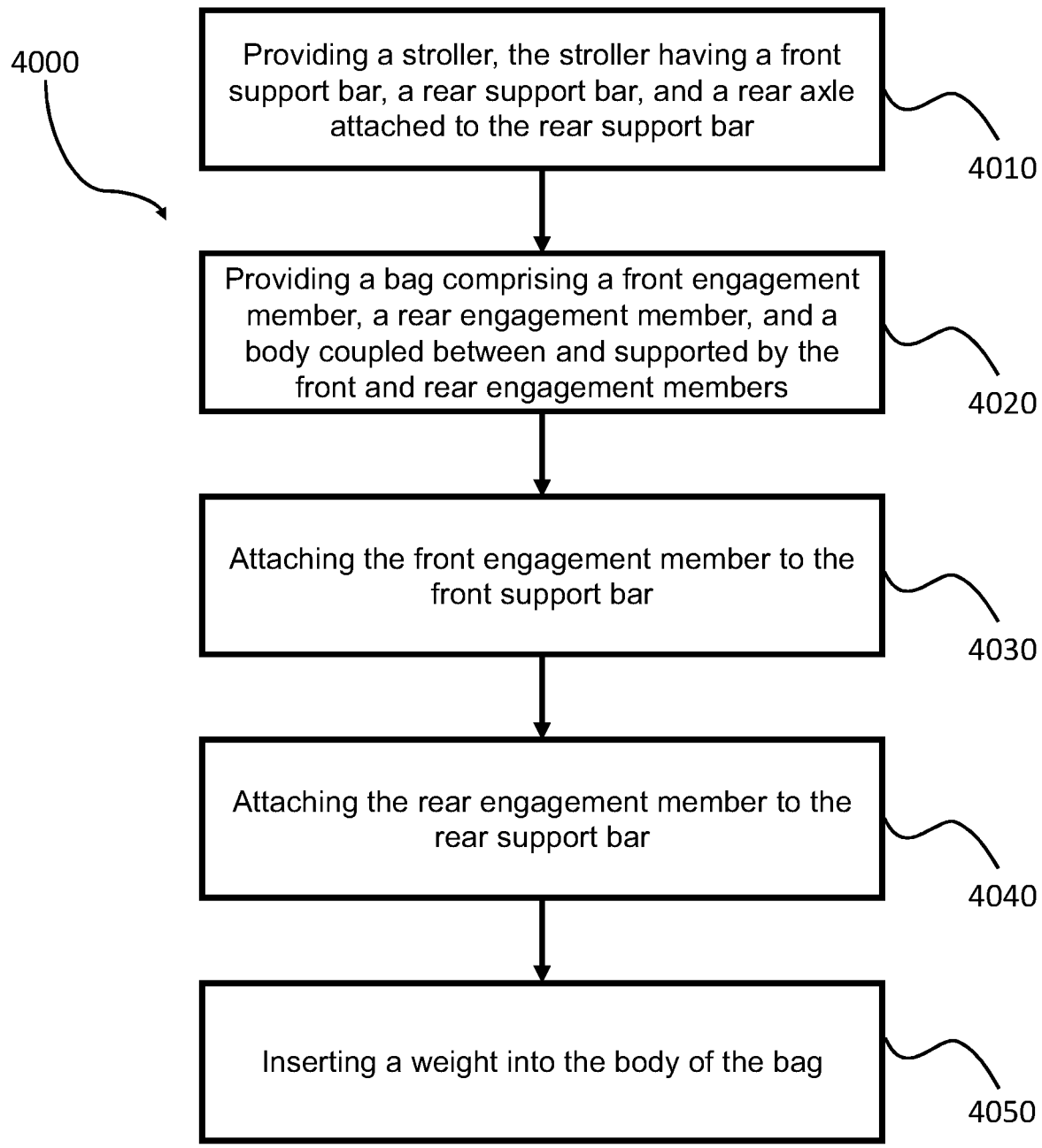
FIG. 15 is a flowchart of an example of a method of stabilizing a stroller.

Referring to FIG. 15, a method 4000 of stabilizing a stroller includes steps 4010, 4020, 4030, 4040 and 4050.

Figure 16:
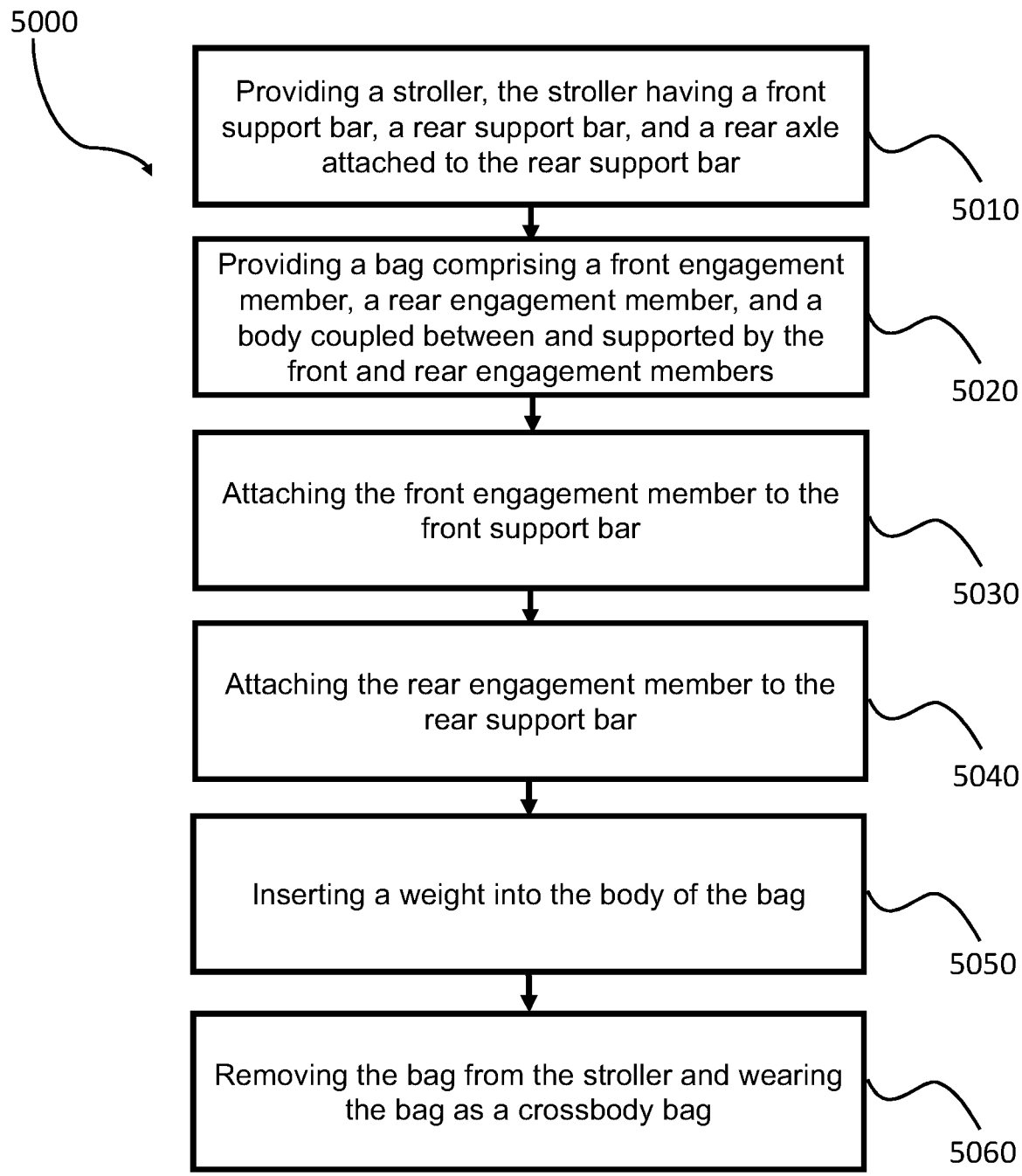
FIG. 16 is a flowchart of another example of a method of stabilizing a stroller.

Referring to FIG. 16, a method 5000 of stabilizing a stroller includes steps 5010, 5020, 5030, 5040, 5050 and 5060.

While the above description provides examples of one or more apparatuses or methods, it will be appreciated that other apparatuses or methods may be within the scope of the accompanying claims.

I claim:

1. A bag configured for attachment to a stroller, the stroller having a front support bar, a rear support bar, and a rear axle, the bag comprising:
    a front engagement member configured for attachment to the front support bar, the front engagement member comprising a first wing;
    a rear engagement member configured for attachment to the rear support bar, the rear engagement member comprising a second wing;
    a body coupled between and supported by the front and rear engagement members, the body comprising a first side panel adjacent the front engagement member, a second side panel opposite the first side panel adjacent the rear engagement member, at least one pocket arranged inside the body, and a receptacle in the at least one pocket attached to an interior surface of the first side panel;
    the first wing extending from the first side panel of the body coupling the body and the front engagement member and the second wing extending from the second side panel of the body coupling the body and the rear engagement member; and
    a weight received by the receptacle proximate to the first side panel,
    wherein each of the first and second wings is generally triangular in shape,
    wherein the first wing tapers upwards towards the front engagement member, and the second wing tapers towards the rear engagement member,
    wherein each of the first and second wings comprises an inward surface comprising a nonslip rubber material configured to frictionally engage the front support bar and the rear support bar, respectively, of the stroller, and
    wherein, when the bag is attached to the stroller, the weight applies a rotational moment at the front support bar of the stroller to resist rotation of the stroller about the rear axle.

2. The bag of claim 1, wherein the weight is removable from the receptacle.

3. The bag of claim 1, wherein each of the front and rear engagement members is ribbon shaped.

4. The bag of claim 1, wherein a length of at least one of the front and rear engagement members is adjustable.

5. The bag of claim 1, wherein each of the front and rear engagement members terminates in a respective fastening mechanism at distal ends thereof for fastening the distal end of the front engagement member to the distal end of the rear engagement member.

6. The bag of claim 1, wherein the fastening mechanisms consist of a quick release buckle.

7. The bag of claim 1, wherein the body comprises a rear panel, and a fastener stay affixed to the rear panel and configured to hold the fastening mechanisms adjacent to the body.

8. The bag of claim 1, wherein the body comprises a rear panel, a ring affixed to the rear panel, and a double-sided hook and loop fastener configured to extend around the front support bar and be secured to the ring.

9. The bag of claim 1, wherein the weight is at least 113, 226, 340, 453, 680, or 903 grams.

10. The bag of claim 1, wherein the weight comprises at least one weight portion, and the weight is adjustable by adding or removing additional weight portions to the weight.

11. The bag of claim 1, wherein the body has a ratio of a length dimension to a height dimension of 1.7.

12. The bag of claim 1, wherein the body comprises at least one of an antibacterial and an antifungal material.

13. The bag of claim 1, wherein the bag is configured to be worn by a user as a crossbody bag.

14. The bag of claim 1, wherein the receptacle is attached to the interior surface of the first side panel by at least one of stitches, adhesives, ultrasonic welding, and heat welding.

15. In combination:
    a stroller comprising a first side and a second side opposite the first side, each of the first and second sides having a front support bar, a rear support bar, and a rear axle; and
    first and second bags configured for attachment to the first and second sides of the stroller, respectively,
    wherein each of the bags comprises:
        a front engagement member attached to the respective front support bar, the front engagement member comprising a first wing;
        a rear engagement member attached to the respective rear support bar, the rear engagement member comprising a second wing;
        a body coupled between and supported by the front and rear engagement members, the body comprising a first side panel adjacent the front engagement member, and a receptacle attached to the first side panel;
        the first wing extending from the first side panel of the body coupling the body and the front engagement member and the second wing extending from the second side panel of the body coupling the body and the rear engagement member; and
        a weight received by the receptacle proximate to the first side panel,
    wherein each of the first and second wings is generally triangular in shape,
    wherein the first wing tapers upwards towards the front engagement member, and the second wing tapers towards the rear engagement member,
    wherein each of the first and second wings comprises an inward surface comprising a nonslip rubber material that frictionally engages the front support bar and the rear support bar, respectively, of the stroller, and
    wherein the weights apply a rotational moment at the front support bars of the stroller to resist rotation of the stroller about the rear axles.

\* \* \* \* \*